United States Patent
DeCristo

(10) Patent No.: US 11,639,128 B2
(45) Date of Patent: May 2, 2023

(54) FRIED FOOD CART ASSEMBLY

(71) Applicant: Samuel DeCristo, Riverside, CA (US)

(72) Inventor: Samuel DeCristo, Riverside, CA (US)

(*) Notice: Subject to any disclaimer, the term of this patent is extended or adjusted under 35 U.S.C. 154(b) by 109 days.

(21) Appl. No.: 17/341,482

(22) Filed: Jun. 8, 2021

(65) Prior Publication Data

US 2022/0388439 A1   Dec. 8, 2022

(51) Int. Cl.
*B60P 3/025* (2006.01)
*A47J 37/12* (2006.01)
*B60P 3/20* (2006.01)
*B62D 63/08* (2006.01)
*B62D 63/06* (2006.01)

(52) U.S. Cl.
CPC ............. *B60P 3/0257* (2013.01); *A47J 37/12* (2013.01); *B60P 3/20* (2013.01); *B62D 63/062* (2013.01); *B62D 63/08* (2013.01)

(58) Field of Classification Search
CPC ........... B60P 3/0257; B60P 3/025; B60P 3/20; F24B 1/207; A47B 31/00; A47B 31/02; A47B 31/026; A47B 2031/002; A47B 2031/003; A47J 37/12
USPC .......................................................... 296/22
See application file for complete search history.

(56) References Cited

U.S. PATENT DOCUMENTS

| | | | |
|---|---|---|---|
| 2,771,318 A * | 11/1956 | Jagsch | B60P 3/0257 296/26.11 |
| 3,748,437 A | 7/1973 | Keeshin | |
| 4,757,755 A | 7/1988 | Sarten | |
| 5,480,170 A * | 1/1996 | Kaiser, II | A47B 31/02 280/30 |
| D414,649 S | 10/1999 | King | |
| D460,596 S | 7/2002 | Bond | |
| 6,416,101 B1 * | 7/2002 | Bartch | B60P 3/0257 296/26.02 |
| 6,736,050 B1 | 5/2004 | MOnn | |
| 8,864,207 B2 * | 10/2014 | Hixson | B60P 3/0257 296/22 |
| 9,663,183 B1 * | 5/2017 | Wilson | B62K 27/12 |
| 10,264,922 B2 | 4/2019 | Rex | |
| 10,582,805 B1 | 3/2020 | Bourgeois | |

(Continued)

FOREIGN PATENT DOCUMENTS

| | | | | |
|---|---|---|---|---|
| CN | 109588866 A | * | 4/2019 | |
| DE | 20307189 U1 | * | 9/2003 | B60P 3/025 |
| WO | WO2012017112 | | 2/2012 | |

OTHER PUBLICATIONS

Guo, Chi. "A kind of table of chain of rings plug hole", CN 109222433, ip.com machine translation, Jan. 18, 2019 (Year: 2019).*

*Primary Examiner* — Jason S Morrow
*Assistant Examiner* — Wenwei Zhuo

(57) ABSTRACT

A fried food cart assembly for preparing fried treats in any location includes a cart that has a hitch which is coupled to the cart. A fryer is positioned in the cart to heat cooking oil for frying a food item. A cold storage unit is positioned in the cart to store perishable food items. A plurality of preparing shelves is each positioned in the cart to facilitate objects to be placed thereon. A point of sale unit is positioned in the cart to conduct financial transactions for patrons purchasing food that is prepared in the cart. An umbrella is positionable in the cart to shield the cart from precipitation and sunlight.

5 Claims, 4 Drawing Sheets

(56) References Cited

U.S. PATENT DOCUMENTS

| | | | |
|---|---|---|---|
| 2003/0067131 A1* | 4/2003 | Morgan | B62B 3/12 |
| | | | 280/79.2 |
| 2008/0098902 A1 | 5/2008 | Mansfield | |
| 2013/0160755 A1 | 6/2013 | Pujol | |
| 2013/0193084 A1* | 8/2013 | Vogt | A47J 37/1223 |
| | | | 210/800 |
| 2018/0126890 A1* | 5/2018 | Crespo | F02M 35/10 |
| 2018/0134202 A1* | 5/2018 | Rupp | B60P 3/007 |
| 2018/0272914 A1* | 9/2018 | El-Wakeel | E04H 15/40 |
| 2019/0217831 A1* | 7/2019 | Viele | G07C 5/0816 |
| 2020/0000138 A1* | 1/2020 | Crawford | A23N 12/10 |

* cited by examiner

FRIED FOOD CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to food cart devices and more particularly pertains to a new food cart device for preparing fried treats in any location. The device includes a cart which is towed by a bicycle, a fryer that is positioned in the cart and a cold storage unit that is positioned in the cart. Additionally, the device includes shelving, a point of sale unit and an umbrella for shading the cart.

(2) Description of Related Art Including Information Disclosed Under 37 CFR 1.97 and 1.98

The prior art relates to food cart devices including a variety of mobile food carts that include a propane fired grill for cooking food. The prior art discloses a propane fired deep fryer that is integrated into a cart. Additionally, the prior art discloses grill cart that can be towed behind a vehicle. The prior art discloses a portable kitchen that includes a variety of modular work surfaces that are foldably integrated into a cart and a cooktop that is integrated into one of the modular work surfaces.

BRIEF SUMMARY OF THE INVENTION

An embodiment of the disclosure meets the needs presented above by generally comprising a cart that has a hitch which is coupled to the cart. A fryer is positioned in the cart to heat cooking oil for frying a food item. A cold storage unit is positioned in the cart to store perishable food items. A plurality of preparing shelves is each positioned in the cart to facilitate objects to be placed thereon. A point of sale unit is positioned in the cart to conduct financial transactions for patrons purchasing food that is prepared in the cart. An umbrella is positionable in the cart to shield the cart from precipitation and sunlight.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
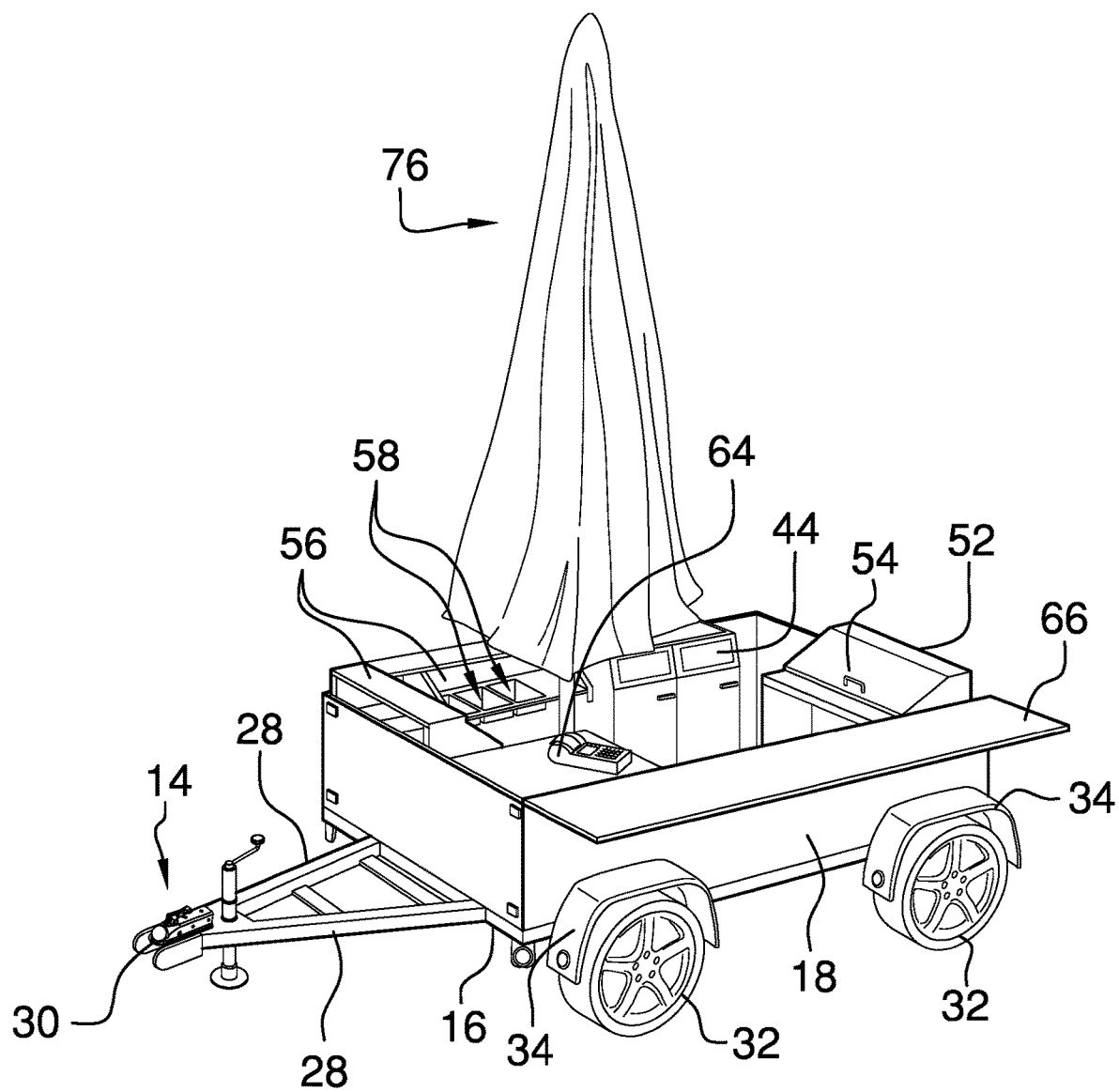
FIG. 1 is a perspective view of a fried food cart assembly according to an embodiment of the disclosure.
Figure 2:
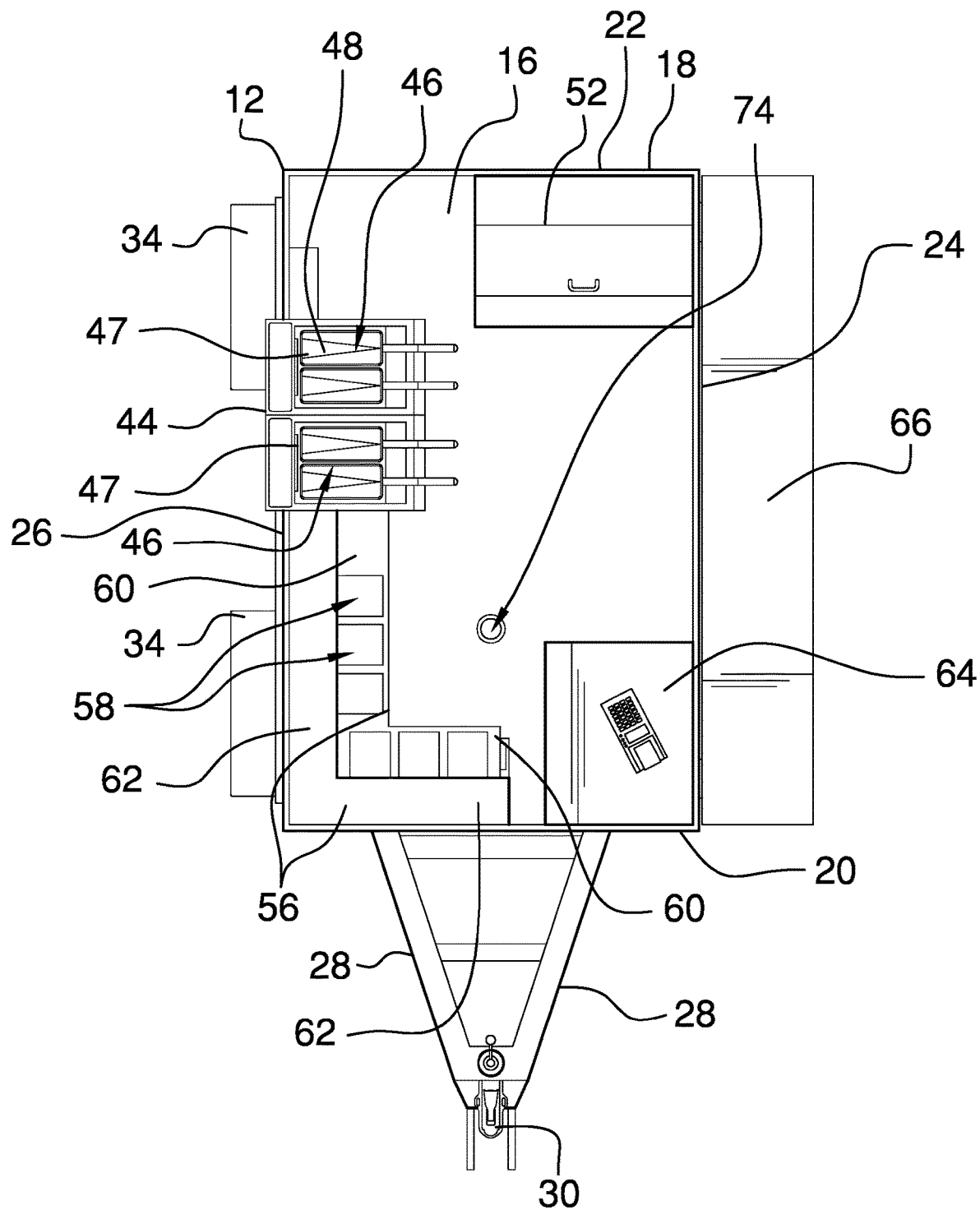
FIG. 2 is a top view of an embodiment of the disclosure.
Figure 3:
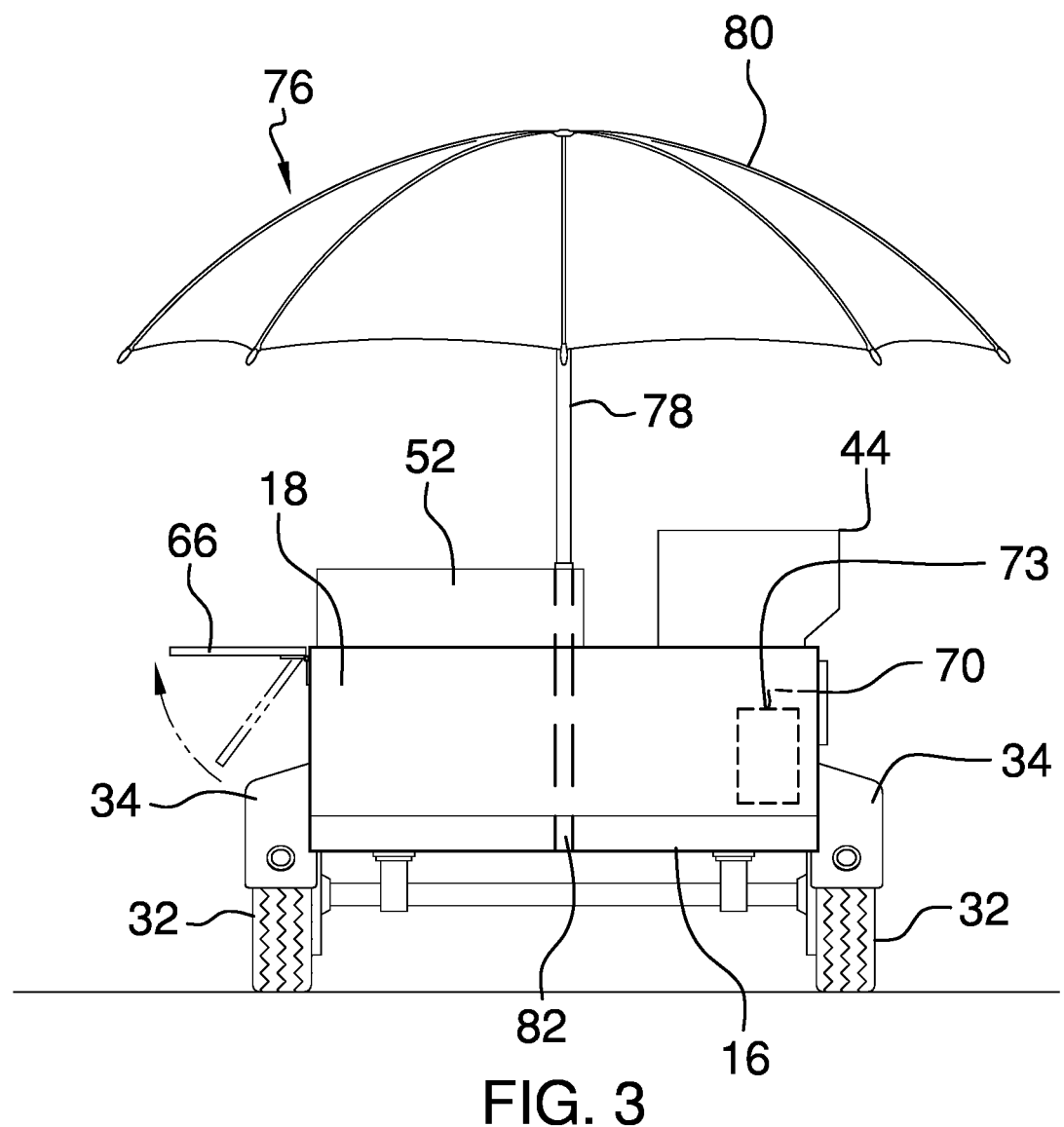
FIG. 3 is a back view of an embodiment of the disclosure.
Figure 4:
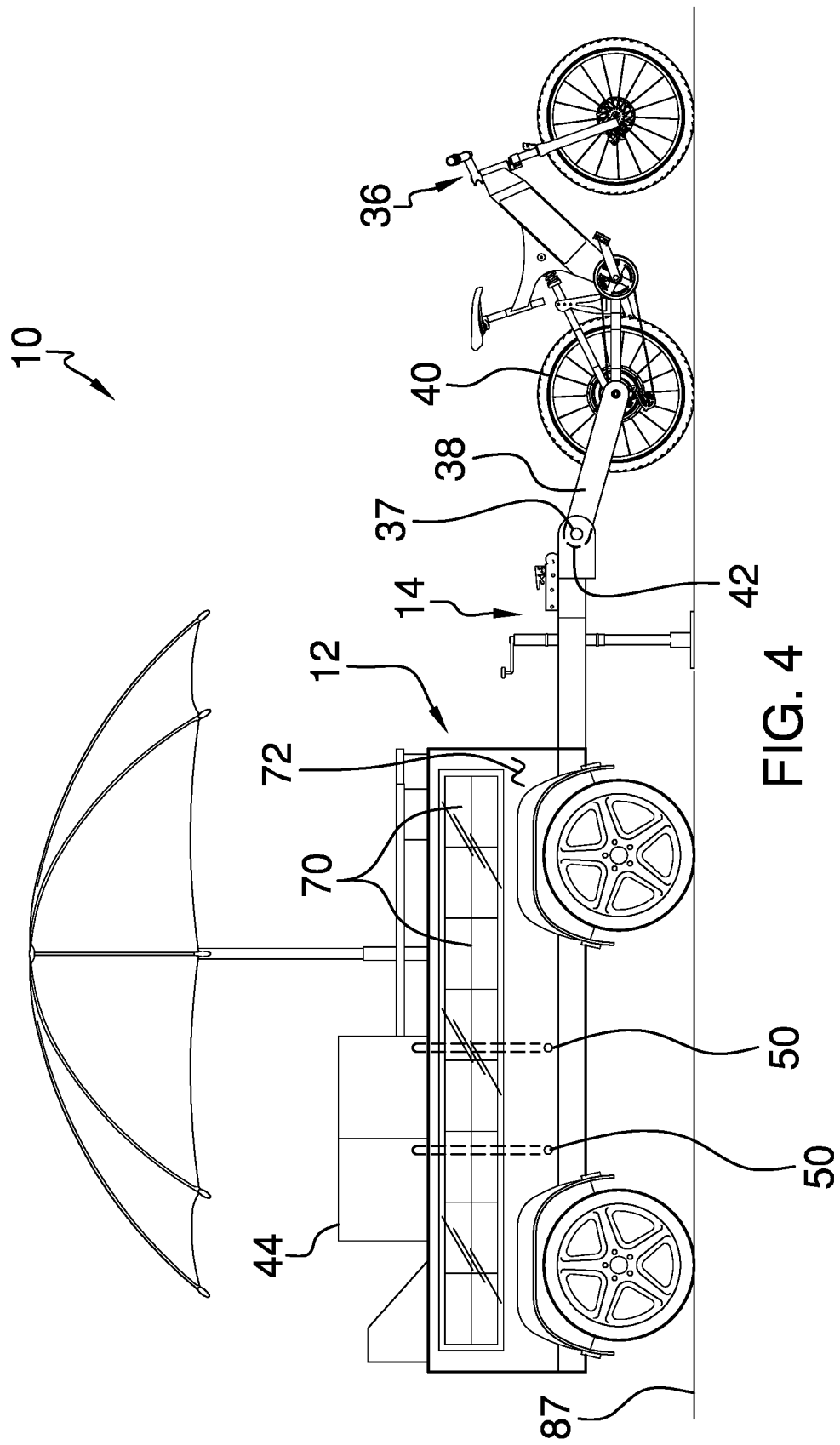
FIG. 4 is a right side view of an embodiment of the disclosure.

With reference now to the drawings, and in particular to FIGS. 1 through 4 thereof, a new food cart device embodying the principles and concepts of an embodiment of the disclosure and generally designated by the reference numeral 10 will be described.

As best illustrated in FIGS. 1 through 4, the fried food cart assembly 10 generally comprises a cart 12 that has a hitch 14 that is coupled to the cart 12. The cart 12 has a bottom wall 16 and a perimeter wall 18 extending upwardly from the bottom wall 16, and the perimeter wall 18 has a front side 20, a back side 22, a first lateral side 24 and a second lateral side 26. The hitch 14 extends away from the front side 20 and the hitch 14 includes a pair of arms 28 that intersect at a point that is spaced from the front side 20. The hitch 14 includes an engagement 30 that is positioned at the point at which the arms 28 intersect, and the engagement 30 is positionable between an engaging position and a disengaging position.

A plurality of wheels 32 is each rotatably coupled to the cart 12 and each of the wheels 32 rolls along a support surface 87. Each of the wheels 32 is positioned on a respective one of the first lateral side 24 and the second lateral side 26 of the perimeter wall 18 of the cart 12, A plurality of fenders 34 is each coupled to a respective one of the first lateral side 24 and the second lateral side 26, and each of the fenders 34 is positioned over a respective one of the wheels 32. Each of the wheels 32 may including designer rims, such as spokes or the like, and rubber tires.

A bicycle 36 is provided and a ball hitch 37 is disposed on the bicycle 36. The hitch 14 on the cart 12 releasably engages the ball hitch 37 thereby facilitating the cart 12 to be towed with the bicycle 36 thereby facilitating a rider to tow the cart 12. The bicycle 36 includes an arm 38 extending rearwardly from a rear wheel 40 of the bicycle 36. The arm 38 has a distal end 42 with respect to the bicycle 36 and the ball hitch 37 is positioned on the distal end 42 of the arm 38. The engagement 30 on the hitch 14 engages the ball hitch 37 for retaining the hitch 14 on the ball hitch 37.

A fryer 44 is provided that has a pair of fry wells 46 is positioned in the cart 12 to heat cooking oil 48 for frying a food item. The fryer 44 may be a propane fryer or an electric fryer. Additionally, the fryer 44 might include pair of baskets 47 that can each be submerged in the cooking oil 48 in each fry well. In this way fried treats, such as fried doughboys or the like, can be prepared in the cart 12. The fryer 44 is positioned against the second lateral side 26 of the perimeter wall 18 of the cart 12. Each of the fry wells 46 has a drain 50 extending through the second lateral side 26 of the perimeter wall 18 to drain the cooking oil 48 from the fry wells 46.

A cold storage unit 52 is positioned in the cart 12 to store perishable food items. The cold storage unit 52 has a cooled interior to keep the perishable food items cooled. The cold storage unit 52 is positioned in an intersection between the back side 22 and the first lateral side 24 of the perimeter wall 18 of the cart 12. Additionally, the cold storage unit 52 might be a propane powered refrigerator, an ice chest or any other type of cold storage unit that includes a door 54 which can be opened to access an interior of the cold storage unit 52.

A plurality of preparing shelves 56 is each positioned in the cart 12 to facilitate objects to be placed thereon. Each of the preparing shelves 56 is positioned against a respective one of the second lateral side 26 of the perimeter wall 18 of the cart 12 and the front side 20 of the perimeter wall 18. The preparing shelves 56 intersect each other at an intersection between the second lateral side 26 and the front side 20, and the preparing shelves 56 on the second lateral side 26 abut the fryer 44. Each of the preparing shelves 56 has a plurality of storage wells 58 that is recessed into the preparing shelves 56 to store condiments and other garnishes. The plurality of preparing shelves 56 includes a set of lower preparing shelves 60 and a set of upper preparing shelves 62 that is spaced upwardly from the lower preparing shelves 60. Additionally, each of the storage wells 58 is positioned on the lower preparing shelves 60.

A point of sale unit 64 is positioned in the cart 12 to conduct financial transactions for patrons purchasing food that is prepared in the cart 12. The point of sale unit 64 is in wireless communication with a payment processing network. The point of sale unit 64 is positioned in an intersection between the front side 20 of the perimeter wall 18 of the cart 12 and the first lateral side 24 of the perimeter wall 18. The point of sale unit 64 abuts the preparing shelves 56 on the front side 20, and the point of sale unit 64 includes a card reader for swiping magnetic credit/debit cards and a secure cash box.

A serving shelf 66 is hingedly coupled to and extends away from the cart 12 such that the serving shelf 66 is accessible to the patrons of the cart 12. The serving shelf 66 extends along a full length of the first lateral side 24 of the perimeter wall 18 of the cart 12. Additionally, the serving shelf 66 is positionable in a deployed position having the serving shelf 66 lying on a horizontal plane on the first lateral side 24. Conversely, the serving shelf 66 is positionable in a folded position having the serving shelf 66 lying against the perimeter wall 18 of the cart 12.

A plurality of solar panels 70 is each coupled to the cart 12 such that each of the solar panels 70 is exposed to sunlight. Each of the solar panels 70 is electrically coupled to the fryer 44 and the point of sale unit 64 for supplying electrical power to the fryer 44 and the point of sale unit 64. Each of the solar panels 70 is positioned on an outside surface 72 of the second lateral side 26 of the perimeter wall 18 of the cart 12, and the solar panels 70 extend along a substantial length of the second lateral side 26. As is most clearly shown in FIG. 3, a battery 73 is integrated into the cart 12 and each of the solar panels 70 is electrically coupled to the battery 73 for charging the battery 73, and the battery 73 may supply electrical power to the fryer 44 and the point of sale unit 64.

An umbrella well 74 is recessed into the bottom wall 16 of the cart 12 and the umbrella well 74 is positioned on a centerline of the cart 12 that extends between the front side 20 and the back side 22 of the perimeter wall 18 of the cart 12. Additionally, the umbrella well 74 is positioned closer to the front side 20 than the back side 22. An umbrella 76 is positionable in the cart 12 to shield the cart 12 from precipitation and sunlight. The umbrella 76 has a pole 78 and a canopy 80, the pole 78 has a bottom end 82 and the bottom end 82 is insertable into the umbrella well 74 having the canopy 80 being elevated over the cart 12. The canopy 80 might include ribs and other hardware associated with collapsible umbrellas.

In use, the cart 12 is towed to a location that offers opportunity to sell food, such as a beach, a concert or other public gathering. The food items can be prepared in the cart 12, as needed, to sell to the public and the point of sale unit 64 facilitates taking payment for the food items. In this way fried treats can be cooked on location and served fresh and hot to the patrons. Additionally, the umbrella 76 provides shade and protection from precipitation if needed. The hitch 14 on the cart 12 can be attached to a vehicle, such as a car, or the bicycle 36, to facilitate the cart 12 to be towed to a broad range of locations.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fried food cart assembly for cooking fried foods at various locations for public consumption, said assembly comprising:

a cart having a hitch being coupled to said cart;

a plurality of wheels, each of said wheels being rotatably coupled to said cart wherein each of said wheels is configured to roll along a support surface;

a plurality of fenders, each of said fender being positioned over a respective one of said wheels;

a bicycle having a ball hitch being disposed on said bicycle, said hitch on said cart releasably engaging said ball hitch thereby facilitating said cart to be towed with said bicycle wherein said bicycle is configured to facilitate a rider to tow said cart;

a fryer having a pair of fry wells being positioned in said cart wherein each of said fry wells is configured to heat a cooking oil to fry a food item;

a cold storage unit being positioned in said cart wherein said cold storage unit is configured to store perishable food items, said cold storage unit having a cooled interior wherein said cold storage unit is configured to keep the perishable food items cooled;

a plurality of preparing shelves, each of said preparing shelves being positioned in said cart wherein each of said preparing shelves is configured to facilitate objects to be placed thereon;

a point of sale unit being positioned in said cart wherein said point of sale unit is configured to conduct financial transactions for patrons purchasing food that is prepared in said cart;

a serving shelf being coupled to and extending away from said cart wherein said serving shelf is configured to be accessible to the patrons of said cart; and an umbrella being positionable in said cart wherein said umbrella is configured to shield said cart from precipitation and sunlight;

wherein said cart has a bottom wall and a perimeter wall extending upwardly from said bottom wall, said perimeter wall having a front side, a back side, a first lateral side and a second lateral side;

wherein said hitch extending away from said front side, hitch including a pair of arms that intersect at a point being spaced from said front side, said hitch including an engagement being positioned at said point at which said arms intersect, said engagement being positionable between an engaging position and a disengaging position;

wherein each of said wheels is positioned on a respective one of said first lateral side and said second lateral side of said perimeter wall of said cart;

wherein each of said fenders being coupled to a respective one of said first lateral side and said second lateral side;

wherein said bicycle includes an arm extending rearwardly from a rear wheel of said bicycle, said arm having a distal end with respect to said bicycle, said ball hitch being positioned on said distal end of said arm, said engagement on said hitch engaging said ball hitch for retaining said hitch on said ball hitch;

wherein said fryer is positioned against said second lateral side of said perimeter wall of said cart, each of said fry wells having a drain extending through said second lateral side of said perimeter wall said drain associated with each of said fry wells is configured to drain the cooking oil from said fry wells;

wherein said cold storage unit is positioned in an intersection between said back side and said first lateral side of said perimeter wall of said cart; and wherein said point of sale unit is positioned in an intersection between said front side of said perimeter wall of said cart and said first lateral side of said perimeter wall, said point of sale unit abutting said preparing shelves on said front side, said point of sale unit including a card reader for swiping magnetic credit/debit cards.

2. The assembly according to claim 1, wherein:
each of said preparing shelves is positioned against a respective one of said second lateral side of said perimeter wall of said cart and said front side of said perimeter wall, said preparing shelves intersecting each other at an intersection between said second lateral side and said front side, said preparing shelves on said second lateral side abutting said fryer;

each of said preparing shelves has a plurality of storage wells being recessed into said preparing shelves wherein each of said storage wells is configured to store condiments and other garnishes; and said plurality of preparing shelves including a set of lower preparing shelves and a set of upper preparing shelves being spaced upwardly from said lower preparing shelves, each of said storage wells being positioned on said lower preparing shelves.

3. The assembly according to claim 1, further comprising a plurality of solar panels, each of said solar panels being coupled to said cart wherein each of said solar panels is configured to be exposed to sunlight, each of said solar panels being electrically coupled to said fryer and said point of sale unit for supplying electrical power to said fryer and said point of sale unit, each of said solar panels being positioned on an outside surface of said second lateral side of said perimeter wall of said cart, said solar panel extending along a substantial length of said second lateral side.

4. The assembly according to claim 1, wherein:
said assembly includes an umbrella well being recessed into said bottom wall of said cart, said umbrella well being positioned on a centerline of said cart extending between said front side and said back side of said perimeter wall of said cart, said umbrella well being positioned closer to said front side than said back side; and said umbrella has a pole and a canopy, said pole having a bottom end, said bottom end being insertable into said umbrella well having said canopy being elevated over said cart.

5. A fried food cart assembly for cooking fried foods at various locations for public consumption, said assembly comprising:
a cart having a hitch being coupled to said cart, said cart having a bottom wall and a perimeter wall extending upwardly from said bottom wall, said perimeter wall having a front side, a back side, a first lateral side and a second lateral side, said hitch extending away from said front side, hitch including a pair of arms that intersect at a point being spaced from said front side, said hitch including an engagement being positioned at said point at which said arms intersect, said engagement being positionable between an engaging position and a disengaging position;

a plurality of wheels, each of said wheels being rotatably coupled to said cart wherein each of said wheels is configured to roll along a support surface, each of said wheels being positioned on a respective one of said first lateral side and said second lateral side of said perimeter wall of said cart;

a plurality of fenders, each of said fenders being coupled to a respective one of said first lateral side and said second lateral side, each of said fender being positioned over a respective one of said wheels;

a bicycle having a ball hitch being disposed on said bicycle, said hitch on said cart releasably engaging said ball hitch thereby facilitating said cart to be towed with said bicycle wherein said bicycle is configured to facilitate a rider to tow said cart, said bicycle including an arm extending rearwardly from a rear wheel of said bicycle, said arm having a distal end with respect to said bicycle, said ball hitch being positioned on said distal end of said arm, said engagement on said hitch engaging said ball hitch for retaining said hitch on said ball hitch;

a fryer having a pair of fry wells being positioned in said cart wherein each of said fry wells is configured to heat a cooking oil to fry a food item, said fryer being positioned against said second lateral side of said perimeter wall of said cart, each of said fry wells having a drain extending through said second lateral side of said perimeter wall said drain associated with each of said fry wells is configured to drain the cooking oil from said fry wells;

a cold storage unit being positioned in said cart wherein said cold storage unit is configured to store perishable food items, said cold storage unit having a cooled interior wherein said cold storage unit is configured to keep the perishable food items cooled, said cold storage unit being positioned in an intersection between said back side and said first lateral side of said perimeter wall of said cart;

a plurality of preparing shelves, each of said preparing shelves being positioned in said cart wherein each of said preparing shelves is configured to facilitate objects to be placed thereon, each of said preparing shelves being positioned against a respective one of said second lateral side of said perimeter wall of said cart and said front side of said perimeter wall, said preparing shelves intersecting each other at an intersection between said second lateral side and said front side, said preparing shelves on said second lateral side abutting said fryer, each of said preparing shelves having a plurality of storage wells being recessed into said preparing shelves wherein each of said storage wells is configured to store condiments and other garnishes, said plurality of preparing shelves including a set of lower preparing shelves and a set of upper preparing shelves being spaced upwardly from said lower preparing shelves, each of said storage wells being positioned on said lower preparing shelves;

a point of sale unit being positioned in said cart wherein said point of sale unit is configured to conduct financial transactions for patrons purchasing food that is prepared in said cart, said point of sale unit being in wireless communication with a payment processing network, said point of sale unit being positioned in an intersection between said front side of said perimeter wall of said cart and said first lateral side of said perimeter wall, said point of sale unit abutting said preparing shelves on said front side, said point of sale unit including a card reader for swiping magnetic credit/debit cards;

a serving shelf being coupled to and extending away from said cart wherein said serving shelf is configured to be accessible to the patrons of said cart, said serving shelf extending along a full length of said first lateral side of said perimeter wall of said cart, said serving shelf lying on a horizontal plane on said first lateral side, said serving shelf being aligned with a top edge of said first lateral side;

a plurality of solar panels, each of said solar panels being coupled to said cart wherein each of said solar panels is configured to be exposed to sunlight, each of said solar panels being electrically coupled to said fryer and said point of sale unit for supplying electrical power to said fryer and said point of sale unit, each of said solar panels being positioned on an outside surface of said second lateral side of said perimeter wall of said cart, said solar panel extending along a substantial length of said second lateral side;

an umbrella well being recessed into said bottom wall of said cart, said umbrella well being positioned on a centerline of said cart extending between said front side and said back side of said perimeter wall of said cart, said umbrella well being positioned closer to said front side than said back side; and an umbrella being positionable in said cart wherein said umbrella is configured to shield said cart from precipitation and sunlight, said umbrella having a pole and a canopy, said pole having a bottom end, said bottom end being insertable into said umbrella well having said canopy being elevated over said cart.

* * * * *